United States Patent [19]

Benjamin et al.

[11] 4,298,208
[45] Nov. 3, 1981

[54] SPRING ACTUATED CHUCK

[75] Inventors: Milton L. Benjamin; Wilbur N. Miles, both of Chagrin Falls, Ohio

[73] Assignee: Erickson Tool Company, Solon, Ohio

[21] Appl. No.: 117,348

[22] Filed: Jan. 31, 1980

[51] Int. Cl.³ .................. B23B 31/06; B23B 31/44; B23C 5/26

[52] U.S. Cl. .................................. 279/91; 279/1 E; 409/234

[58] Field of Search ................ 409/231, 232, 234; 279/91, 1 B, 1 E

[56] References Cited

U.S. PATENT DOCUMENTS 3,380,746  4/1968  Benjamin et al. .................. 279/91
3,743,307  7/1973  Benjamin et al. .................. 279/91

Primary Examiner—Z. R. Bilinsky
Attorney, Agent, or Firm—Maky, Renner, Otto & Boisselle

[57] ABSTRACT

A spring actuated chuck wherein a slotted flange, tapered shank tool adapter is clamped to a holder by a spring actuated clamping and ejecting nut assembly which includes a nut having threaded engagement with the holder, a clamping ring rotatably adjustably secured to the nut having clamping lugs to engage the flange of the adapter to clamp the adapter to the holder, an ejector axially retained in the nut and non-rotatably axially slidably engaged with the holder to engage the flange of the adapter thus to release the adapter from the holder, and a latch member extending axially from the holder and engaged with the clamping ring operative upon movement by the flange of the adapter to release the nut assembly for spring actuated clamping movement. Release of the adapter is effected by rotation of the nut in the opposite direction against spring pressure for engagement of the ejector with the flange of the adapter and for re-engagement of the latch member with the clamping ring. The spring actuated chuck herein is further characterized in that the threads of the nut and an annular chamber containing the nut actuating spring are isolated from fine chips and coolant when a tool mounted in the adapter is performing a cutting operation.

18 Claims, 6 Drawing Figures

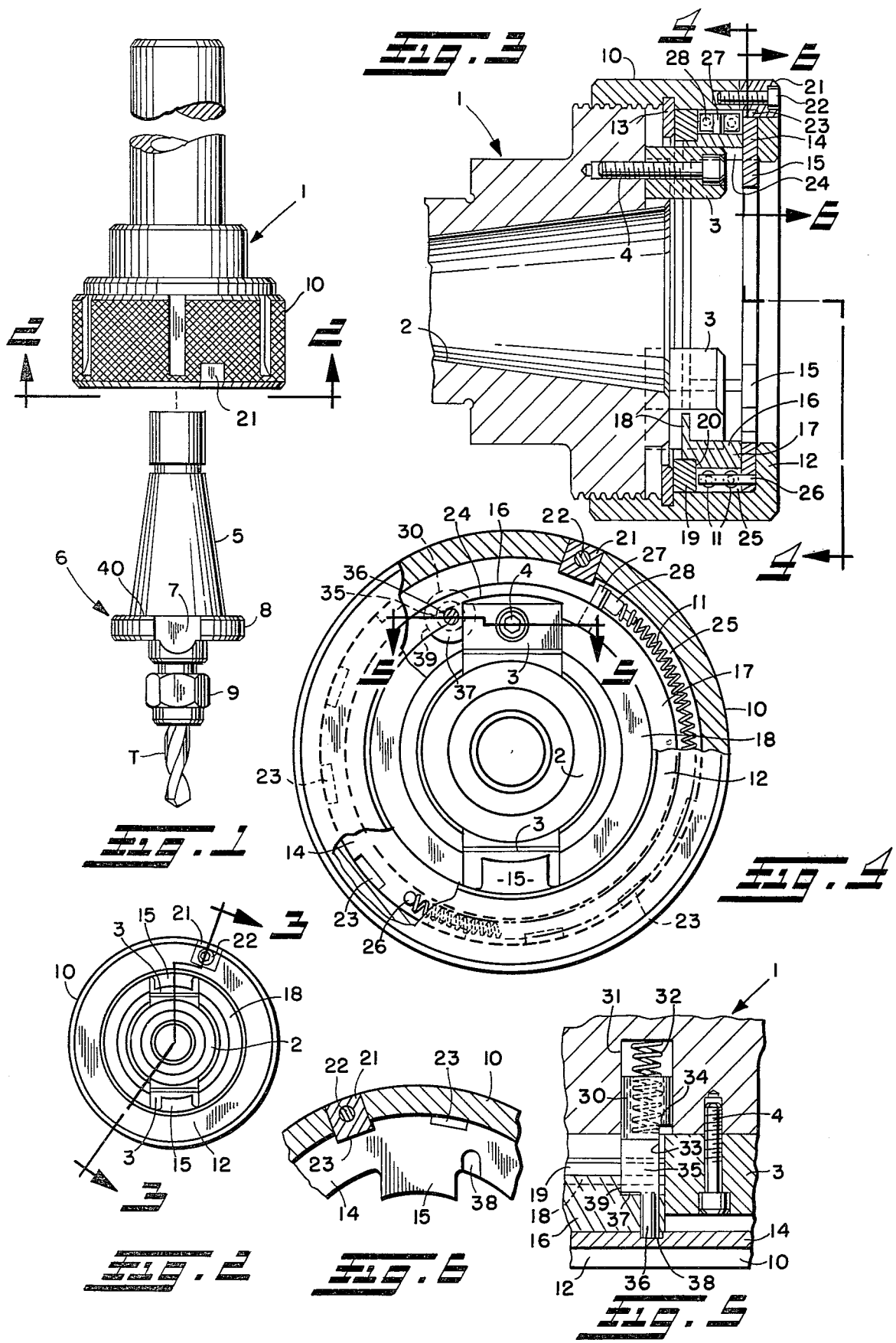

SPRING ACTUATED CHUCK

BACKGROUND OF THE INVENTION

It is known as disclosed for example in the Milton L. Benjamin et al U.S. Pat. No. 3,743,307, granted July 3, 1973, to provide a spring actuated chuck in which a clamping and releasing nut assembly is released for spring actuation upon insertion of the shank of a tool adapter into the socket of a holder to clamp the adapter to the holder, the adapter being released from the holder by rotation of the nut in the opposite direction against spring pressure to a latched position whereat the adapter is released for axial withdrawal from the holder. In this form of spring actuated chuck the threads of the nut and also a latching groove therein are exposed to fine chips and coolant when a tool mounted in the adapter is performing a cutting operation thereby necessitating a strong spring to assure desired spring actuation of the nut and to assure proper latching when the adapter is to be released from the holder. Generally the springs in known spring actuated chucks are so strong that the increased clamping force due to the spring and to the increased inertia of the nut assembly and vibration requires the use of a wrench to rotate the nut back to its latched unlocking position to release the adapter for removal and replacement.

Furthermore, in known spring actuated chucks, the ejector and clamping lugs generally rotate in unison whereby the ejector lug or lugs may have frictional sliding engagement with the flange of the adapter during the adapter clamping operation. Moreover, during the releasing operation, relatively high contact pressures are entailed between the circumferentially narrow ejector lug or lugs in sliding frictional engagement with the flange of the adapter.

SUMMARY OF THE INVENTION

Contrary to the foregoing, the spring actuated chuck herein is provided with a threadedly engaged holder and nut assembly having a latch mechanism operated by the flange of a tool adapter inserted into the nut, and a spring to rotate the nut to clamp the tool adapter by its flange upon operation of the latch mechanism, the threads of the nut, the latch mechanism, and the spring being effectively isolated from contamination by fine chips and coolant to enable the use of a relatively weak spring to achieve desired firm clamping of the adapter in the holder-nut assembly but yet permitting release of the adapter by hand operation of the nut without employment of a wrench. The chuck herein is further characterized in that the ejector for engaging the flange of the tool adapter for releasing the tool adapter for withdrawal upon rotation of the nut to latched position is axially slidably keyed to the holder so as to exert direct axial pressure on a large area of the flange of the tool adapter without sliding friction.

BRIEF DESCRIPTION OF THE DRAWING

In the annexed drawing:

FIG. 1 is an exploded elevation view of a holder and a tool adapter in separated condition, the holder being operative to be automatically spring actuated to grip the adapter upon insertion of the tapered shank and slotted flange thereof into the holder;

FIG. 2 is an end view of the holder as viewed along the line 2—2 of FIG. 1;

FIG. 3 is a cross section view on enlarged scale taken substantially along the line 3—3 of FIG. 2;

FIG. 4 is a view taken substantially along the line 4—4 of FIG. 3;

FIG. 5 is a fragmentary cross section view taken substantially along the line 5—5 of FIG. 4; and FIG. 6 is a fragmentary cross section view taken substantially along the line 6—6 of FIG. 3.

DETAILED DESCRIPTION OF A PREFERRED EMBODIMENT

The spring actuated chuck herein comprises a holder 1 which is adapted to be secured to a spindle of a milling machine, boring mill, drill press or the like or fashioned to be mounted to, for example, a lathe turret. The end of the holder 1 is provided with a tapered socket 2 and a pair of diametrically opposite axially extending keys 3 which are secured by screws 4 in the slot extending diametrically across the end of the holder 1 in axially projecting relation to the holder 1. The socket 2 is adapted to be engaged by the correspondingly tapered shank 5 of a tool adapter 6, and the keys 3 are adapted to extend axially into the diametrically opposite slots 7 of the flange 8 of the tool adapter 6 thus to hold the tool adapter 6 coaxially of the holder 1 and against rotation with respect to the holder 1.

The tool adapter 6 is herein shown as having a collet chuck 9 adapted to hold a drill, a reamer or like tool T. The tool adapter 6 may, if desired, be fashioned for mounting an end mill, a shell and face mill, a boring head, a tapered shank drill or other tool.

In screw threaded engagement with the holder 1 is a nut 10 which upon insertion of the tool adapter 6 into the holder 1 and nut 10 is operative to unlatch the nut 10 for spring actuation in clamping direction in which the tool adapter 6 is clamped in the holder 1 with its tapered shank 5 in mating engagement with the socket 2 and with its slotted flange 8 nonrotatably engaging the keys 3.

When it is desired to release the tool adapter 6 from the holder 1, the nut 10 is manually rotated in the opposite direction to a relatched position whereat the nut actuating spring 11 is re-compressed. During such rotation, axial pressure is exerted on the flange 8 of the tool adapter 6 to release the tapered shank 5 from the socket 2 for easy axial withdrawal of the tool adapter 6 from the holder 1.

Axially retained within the nut 10 between the inturned flange 12 thereof and the snap ring 13 engaged in a groove in the nut 10 is a peripherally notched clamping ring 14 having radially inwardly extending clamping lugs 15; an ejector 16 having a tubular portion 17 adjacent to the clamping ring 14 and having an inturned ejector flange 18 axially spaced from the clamping ring 14 a distance slightly greater than the axial thickness of the flange 8 of the tool adapter 6; and a thrust washer 19 between the snap ring 14 and a shoulder 20 of the ejector 16. The clamping ring 14 is rotatably adjustably keyed in the nut 10 by means of a key 21 which is detachably secured to the nut 10 by a screw 22 and which is engaged in a selected peripheral notch 23 of the clamping ring 14. Herein, twelve equally spaced notches 23 enable adjustment of the clamping ring 14 with respect to the nut 10 in 30° increments to assure clamping and unclamping of the adapter 6 within a part-turn rotation (less than 180°) of the nut in opposite directions. Of course, a larger or smaller increment of adjustment may be provided by decreasing or increasing the number of notches 23.

The ejector 16 has diametrically opposite slots or grooves 24 which axially slidably fit over the keys 3 of the holder 1 whereby rotation of the nut 10 in opposite directions causes axial movement of the ejector flange 18 toward and away from the holder 1 as the clamping lugs 15 of the clamping ring 14 move angularly and axially toward and away from the holder 1 into and out of engagement with the axially outer face of the flange 8 of the tool adapter 6. When the ejector flange 18 moves axially outward, it engages the axially inner face of flange 8 to release the shank 5 from the socket 2.

To achieve spring actuation of the nut 10 in clamping direction, a pair of elongated coil springs 11 is disposed in an annular chamber 25 defined between the nut 10 and the tubular portion 17 of the ejector 16 and between the thrust washer 19 and the clamping ring 14, one end of the springs 11 being abutted against an axially disposed pin 26 press fitted or otherwise secured to the clamping ring 15 and the other end of the springs 11 being abutted against a radially extending pin 27 press fitted into the tubular portion 17. A block 28 between the pin 27 and the springs 11 has pilots as shown extending into the respective springs 11. The springs 11 are relatively weak and are preferably of unstressed length slightly greater than the circumference of the annular chamber 25 to provide a spring load on the nut 10 up to the maximum angle of rotation thereof whereat the pins 26 and 27 are adjacent to each other. In FIG. 4 the springs 11 are compressed to achieve, if necessary, nearly one-half revolution of the nut 10 upon release of the latch mechanism which is now to be described.

The latch mechanism cmprises a latch pin 30 which is axially slidable in a hole 31 drilled in the holder 1 adjacent to the upper key 3, a spring 32 being compressed between the bottom of the hole 31 and the latch pin 30. The latch pin 30 has a flat 33 alongside the upper key 3 which forms a shoulder 34 so that the latch pin 30 will be retained in the holder 1 when the nut 10 is removed. The latch pin 30 also has another flat 35 to clear the inside diameters of the snap ring 14 and thrust washer 19. The small coaxial end 36 of the latch pin 30 forms a shoulder 37 and extends through a hole in the tubular portion 17 of the ejector 16 for engagement of its projecting end in a notch 38 in the clamping ring 14, the circumferential width of the notch 38 being slightly greater than the diameter of the small end 36 of the latch pin 30. The ejector 16 is counterboard as at 39 to receive the shoulder 37, the counterbore 39 breaking through the ejector flange 18 so that the shoulder 37 of the latch pin 30 projects axially outwardly of the flange 18 a distance equal to or slightly greater than the axial depth of the notch 38.

Accordingly, when the corner 40 of the adapter flange 8 contacts the latch pin shoulder 37 and pushes the latch pin 30 axially inwardly until the shoulder 37 is flush with the ejector flange 18, the latch pin end portion 36 will be moved axially inward out of the notch 38 whereupon the springs 11 will rotate the nut 10 in a clockwise direction as viewed in FIGS. 2 and 4 to effect engagement of the clamping lugs 15 with the axially outer face of the flange 8 to urge the tool adapter 6 axially inwardly to engage the tapered shank 5 with the socket 2.

When the nut 10 is rotated in a counterclockwise direction from the clamping position to the position shown in FIGS. 2 and 4, the end portion 36 of the latch pin 30 will be biased by spring 32 into the notch 38 to relatch the nut 10 and, during such rotation, the ejector flange 18 will exert axial pressure on the axially inner face of the adapter flange 8 to release the tapered shank 5 from the socket 2. In the latched position of the nut 10, the clamping lugs 15 which are narrower than the keys 3 (and slots 7) will be aligned with the keys 3 so that the tool adapter 1 may be completely axially withdrawn from the holder 1.

The inside diameters of the nut flange 12, the clamping ring 14, and the ejector 16 are preferably slightly larger than the outside diameter of the flange 8 for ease of insertion and withdrawal of the tool adapter and, as apparent, the closed construction of the nut assembly prevents fine chips and coolant from reaching the nut threads, the latch mechanism, and the spring chamber 25 so that strong stiff springs need not be employed to assure spring actuation of the nut 10, which otherwise would be contaminated by fine chips and coolant. Furthermore, if strong stiff springs are employed, it has been found that a wrench must be employed to rotate the nut in tool adapter releasing direction.

In initially screwing the nut 10 on the holder 1 for adjustment of the clamping and ejecting operations and for desired preloading of the springs 11, the key 21 will be removed so that the springs 11 will be under minimum compression with the clamping ring pin 26 disposed adjacent to the ejector pin 27. The nut 10 is then positioned so that ejector grooves 24 line up with the keys 3 and so that the latch pin portion 36 will enter the hole through the tubular portion 17 of the ejector 16 whereupon rotation of the nut 10 will advance the nut 10 toward the holder 1. As the nut 10 is rotated, the small end 36 of the latch pin 30 will eventually engage the axially inner face of the clamping ring 14 at which time the shoulder 37 will be substantially flush with the ejector flange 18 or will project axially therefrom a minute distance. The rotation of the nut 10 is then continued until the clamping lugs 15 are a predetermined minimum distance from the holder 1. The end of the bottom key 3 may be a convenient reference point for gaging said minimum distance.

To achieve a slight overlap of the upper clamping lug 15 with the lower key 3 the left side of the lower clamping lug 15 is partly cut away to obtain such overlap in the maximum angularly displaced position of the clamping ring 14 with respect to the ejector 16 either for direct engagement with the lower key 3 or for insertion of a gage block. If a notch 23 registers with the slot for key 21, the key 21 is assembled in place by screw 22. Otherwise, the clamping ring 14 will be rotated counterclockwise with respect to the nut 10 until a notch 23 does so register for installation of key 21. This will result in a slightly increased preload of springs 11. Thereafter, the nut 10 and ring 14 keyed thereto may be manually rotated counterclockwise until the end 36 of the latch pin 30 pops into the notch 38 thereby to latch the nut 10 with clamping lugs 15 aligned with the keys 3 ready for axial insertion of a tool adapter 6 and consequent unlatching of the nut 10 for spring actuation in clamping direction.

The embodiments of the invention in which an exclusive property or privilege is claimed are defined as follows:

1. In a chuck of the type wherein a holder has a tapered socket to receive the tapered shank of a flanged tool adapter and a pair of diametrically opposite keys to axially interfit in the slots in the flange of said adapter, the combination therewith of a nut having threaded engagement with said holder; a clamping ring angularly adjustably keyed and axially retained in said nut having a pair of radially inwardly extending clamping lugs to engage the axially outer face of said adapter flange to urge said shank into mating engagement with said socket upon rotation of said nut and ring in one direction from an unclamping position whereat said lugs are aligned with said keys; and an ejector rotatably and axially fixedly supported in said nut having a tubular portion surrounding said adapter flange and extending axially inward from said ring, said ejector having a radially inwardly extending ejector flange which is slotted to non-rotatably and axially slidably embrace said keys and which is engageable with the axially inner face of said adapter flange to disengage said shank from said socket during rotation of said nut and ring in the opposite direction to said unclamping position.

2. The chuck of claim 1 wherein said tubular portion and said nut define an annular chamber therebetween; and wherein a circumferentially extending spring in said chamber is compressed circumferentially between circumferentially spaced apart spring abutment members extending into said chamber from said ring and tubular portion respectively; said spring being operative to bias said nut and ring in said one direction.

3. The chuck of claim 1 wherein said ring has a plurality of circumferentially spaced apart peripheral notches; and wherein said nut has a key detachably secured thereto to engage a selected peripheral notch for assuring clamping and unclamping of said adapter within a part-turn rotation of said nut and ring in opposite directions.

4. The chuck of claim 1 wherein spring means in said nut bearing on said ejector and said ring is operative to rotate said nut and ring in said one direction; and wherein said holder has an axially spring-biased latch pin which extends axially through said tubular portion into a notch in said ring to retain said lugs in alignment with said keys and which has a shoulder axially outward of said ejector flange adapted to be engaged by the axially inner face of said adapter flange for moving said latch pin axially inwardly for axially withdrawing said latch pin from said notch thereby releasing said nut and ring for spring actuation in said one direction; said latch pin being spring-biased into re-engagement with said notch upon manual rotation of said nut and ring in the opposite direction against said spring means to a position whereat said lugs are aligned with said keys and upon axial withdrawal movement of said adapter.

5. The chuck of claim 4 wherein said ejector has stop means engaged by said latch pin to position said shoulder axially outward of said ejector flange a distance at least as great as the axial projection of said latch pin into said notch.

6. The chuck of claim 5 wherein said stop means comprises the bottom of a counterbore in said ejector which in said tubular portion radially outward of said ejector flange, is engaged by said shoulder.

7. The chuck of claim 5 wherein said latch pin is axially slidable in a cylindrical recess in said holder and is biased axially outward by a spring compressed between said latch pin and the bottom of said recess.

8. The chuck of claim 7 wherein one of said keys is detachably secured to said holder with an edge portion of said key radially overlapping a portion of said recess; said latch pin having a longitudinal flat alongside said one key to form another shoulder which engages said edge portion upon removal of said nut, ring, and ejector from said holder.

9. The chuck of claim 1 wherein a thrust washer axially retained in said nut is engaged with an axially inwardly facing shoulder of said tubular portion to move said ejector flange axially outwardly during rotation of said nut and ring in said opposite direction; said washer and shoulder also being operative to retain the axially outer end of said tubular portion in close proximity with the axially inner face of said ring.

10. The chuck of claim 9 wherein said thrust washer supports said ejector coaxially within said nut and enables rotation of said nut and ring in opposite directions with respect to said ejector.

11. The chuck of claim 9 wherein a snap ring in a groove in said nut axially retains said thrust washer in said nut.

12. The chuck of claim 9 wherein said tubular portion is radially spaced within said nut, and said thrust washer is axially spaced from said ring to define an annular chamber having concentric side walls and transverse end walls; and wherein a circumferentially extending spring in said chamber is compressed circumferentially between circumferentially spaced abutment members extending axially inward and radially outward into said chamber respectively from said ring and tubular portion.

13. The chuck of claim 12 wherein said ring has a plurality of circumferentially spaced apart peripheral notches; and wherein said nut has a key detachably secured thereto to engage a selected peripheral notch for varying the preload of said spring and for assuring clamping of said adapter within a part-turn rotation of said nut and ring.

14. In a chuck of the type wherein a holder has a tapered socket to receive the tapered shank of a flanged tool adapter and a pair of diametrically opposite keys to axially interfit in the diametrically opposite slots in the flange of said adapter, the combination therewith of a nut having threaded engagement with said holder; a clamping ring angularly adjustably keyed in said nut having a pair of radially inwardly extending clamping lugs to engage the axially outer face of said flange upon rotation of said nut and ring in one direction from an unclamping position whereat said lugs are aligned with said keys; an ejector rotatably and axially fixedly supported in said nut having a tubular portion surrounding said adapter flange and extending axially inward from said ring, said ejector having a radially inwardly extending ejector flange which is of inside diameter less than the outside diameter of said adapter flange and which is axially spaced from said clamping lugs a distance at least as great as the axial thickness of said adapter flange; said ejector flange being slotted to non-rotatably and axially slidably embrace said keys whereby, during rotation of said nut and ring in the opposite direction to a position whereat said lugs are aligned with said keys, said ejector flange engages the axially inner face of said adapter flange to release said shank from said socket for axial withdrawal of said adapter from said holder; spring means in said nut operative to rotate said nut and ring in said one direction; said holder having an axially spring-biased latch pin which extends into a notch in said ring to retain said lugs in alignment with said keys and which has a shoulder axially outward of said ejector flange adapted to be engaged by the axially inner face of said adapter flange for moving said latch pin axially inwardly for axially withdrawing said latch pin from said notch thereby releasing said nut and ring for spring actuation in said one direction; said latch pin being spring-biased into re-engagement with said notch upon manual rotation of said nut and ring in the opposite direction against said spring means to a position whereat said lugs are aligned with said keys and upon axial withdrawal movement of said adapter.

15. The chuck of claim 14 wherein said tubular portion and said nut define an annular chamber therebetween; and wherein said spring means comprises a circumferential extending spring in said chamber compressed circumferentially between circumferentially spaced apart spring abutment members extending into said chamber from said ring and tubular portion respectively.

16. The chuck of claim 15 wherein said ring has a plurality of circumferentially spaced apart peripheral notches; and wherein said nut has a key detachably secured thereto to engage a selected peripheral notch for varying the preload of said spring and for assuring clamping and unclamping of said adapter within a part-turn rotation of said nut and ring in opposite directions.

17. The chuck of claim 15 wherein said abutment members are adjacent to one another to determine the maximum angle of rotation of said ring in said one direction with respect to said ejector and to determine the minimum compression of said spring whereat said lugs have rotated less than 180° in said one direction to positions circumferentially adjacent to the respective keys; and wherein said ring is keyed to said nut at or prior to said maximum angle of rotation while said nut is in a position establishing a predetermined minimum axial distance between said holder and said clamping lugs.

18. The chuck of claim 17 wherein one lug is of narrower circumferential width than the other lug so that the latter at the maximum angle of rotation of said ring circumferentially overlaps a portion of the adjacent key, the axially outer end of the last-mentioned key constituting a reference point for determining such predetermined minimum axial distance.

* * * * *